United States Patent
Stein

(10) Patent No.: US 12,515,589 B2
(45) Date of Patent: Jan. 6, 2026

(54) METHOD FOR OPERATING A GATED CAMERA, CONTROL DEVICE FOR CARRYING OUT SUCH A METHOD, OVER-THE-SHOULDER VIEW DEVICE HAVING SUCH A CONTROL DEVICE, AND MOTOR VEHICLE HAVING SUCH AN OVER-THE-SHOULDER VIEW DEVICE

(71) Applicant: Daimler Truck AG, Leinfelden-Echterdingen (DE)

(72) Inventor: Fridtjof Stein, Ostfildern (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 29 days.

(21) Appl. No.: 18/571,023

(22) PCT Filed: Jun. 14, 2022

(86) PCT No.: PCT/EP2022/066149
§ 371 (c)(1),
(2) Date: Dec. 15, 2023

(87) PCT Pub. No.: WO2022/263435
PCT Pub. Date: Dec. 22, 2022

(65) Prior Publication Data
US 2024/0190349 A1 Jun. 13, 2024

(30) Foreign Application Priority Data
Jun. 18, 2021 (DE) .................... 10 2021 003 153.9

(51) Int. Cl.
*B60R 1/26* (2022.01)

(52) U.S. Cl.
CPC .......... *B60R 1/26* (2022.01); *B60R 2300/301* (2013.01); *B60R 2300/307* (2013.01);
(Continued)

(58) Field of Classification Search
CPC .......... G06K 9/00201; G06K 9/00778; G06K 9/00785; G06K 9/00791; G06K 9/00798;
(Continued)

(56) References Cited

U.S. PATENT DOCUMENTS

2005/0134440 A1  6/2005  Breed
2008/0046150 A1  2/2008  Breed
(Continued)

FOREIGN PATENT DOCUMENTS

DE  10 2018 002 955 A1  10/2018
DE  10 2020 002 994 A1  7/2020
(Continued)

OTHER PUBLICATIONS

International Search Report (PCT/ISA/210) issued in PCT Application No. PCT/EP2022/066149 dated Aug. 23, 2022 (3 pages).
(Continued)

*Primary Examiner* — Nathnael Aynalem
(74) *Attorney, Agent, or Firm* — Crowell & Moring LLP

(57) ABSTRACT

A method for operating a gated camera which has a lighting device and an optical sensor in a motor vehicle opposite to a direction of travel of the motor vehicle. An actuation of the lighting device and of the optical sensor are chronologically coordinated with each other. A first visible spacing region is assigned to a first coordinated actuation. Via the first coordinated actuation, a first recording of the first visible spacing region is recorded opposite to the direction of travel. Objects are searched for via the first recording. When an object is found, a first object spacing is estimated as a spacing between the found object and the optical sensor. A planned movement trajectory of the motor vehicle is evaluated on a basis of the first object spacing.

9 Claims, 2 Drawing Sheets

(52) U.S. Cl.
CPC ... *B60R 2300/802* (2013.01); *B60R 2300/804* (2013.01); *B60R 2300/8066* (2013.01); *B60R 2300/8093* (2013.01)

(58) Field of Classification Search
CPC .......... G06K 9/00805; G06K 9/00812; G06K 9/00818; G06K 9/00825; G06K 9/00845; G06K 9/325; G06K 2209/15; G06K 2209/23; G06T 2207/30236; G06T 2207/30248; G06T 2207/30252; G06T 2207/30256; G06T 2207/30261; G06T 2207/30264; G06T 2207/30268; G08G 1/16; G08G 1/116; G08G 1/167; G08G 1/166; G08G 1/168; G08G 1/20; B60W 50/14; B60W 2050/143; B60W 2550/10; B60W 2550/14; B60R 2001/1215; B60R 2025/1013; B60R 2025/1016; G01S 17/93; G01S 17/931; H04W 4/40
USPC ......................................................... 348/148

See application file for complete search history.

(56) References Cited

U.S. PATENT DOCUMENTS

| | | | | |
|---|---|---|---|---|
| 2014/0363050 | A1* | 12/2014 | Hayakawa | G01S 17/08 382/103 |
| 2015/0160340 | A1* | 6/2015 | Grauer | G01S 17/88 356/5.04 |
| 2016/0116593 | A1* | 4/2016 | Kim | G01S 17/931 356/5.01 |
| 2018/0288320 | A1* | 10/2018 | Melick | G01S 13/931 |

FOREIGN PATENT DOCUMENTS

| | | | | |
|---|---|---|---|---|
| DE | 102020003199 | A1 * | 8/2020 | ......... G06K 9/00791 |
| DE | 102020003218 | A1 * | 10/2020 | ............. B60Q 1/02 |
| DE | 102021000447 | A1 * | 3/2021 | |
| WO | WO 2019/012085 | A1 | 1/2019 | |

OTHER PUBLICATIONS

German-language German Office Action issued in German Application No. 10 2021 003 153.9 dated May 5, 2022 (9 pages).
Bijelic et al., "Benchmarking Image Sensors Under Adverse Weather Conditions for Autonomous Driving", *arxiv.org, Cornell University Library, 201 OLIN Library Cornell Universtiy Ithaca, NY 14853*, Dec. 6, 2019, XP081546775 (7 pages).

* cited by examiner

METHOD FOR OPERATING A GATED CAMERA, CONTROL DEVICE FOR CARRYING OUT SUCH A METHOD, OVER-THE-SHOULDER VIEW DEVICE HAVING SUCH A CONTROL DEVICE, AND MOTOR VEHICLE HAVING SUCH AN OVER-THE-SHOULDER VIEW DEVICE

BACKGROUND AND SUMMARY OF THE INVENTION

The invention relates to a method for operating a gated camera, a control device for carrying out such a method, an over-the-shoulder view device having such a control device, and a motor vehicle having such an over-the-shoulder view device.

In particular when motor vehicles are autonomous, it is strictly necessary to perceive and survey the surroundings in order to move the motor vehicle safely and without risk. Changing lanes and/or merging into a lane represents a significant challenge—in particular for autonomous heavy goods vehicles.

The object of the invention is to provide a method for operating a gated camera, a control device for carrying out such a method, an over-the-shoulder view device having such a control device, and a motor vehicle having such an over-the-shoulder view device, wherein the specified disadvantages are at least partially alleviated, preferably avoided.

The object is solved by providing the present technical teaching, in particular the teaching of the independent claims, and the embodiments disclosed in the dependent claims and the description.

The object is in particular solved by providing a method for operating a gated camera, which has a lighting device and an optical sensor, in a motor vehicle opposite to the direction of travel of the motor vehicle, wherein an actuation of the lighting device and of the optical sensor are chronologically coordinated with each other. A first visible spacing region is assigned to a first coordinated actuation, wherein a first recording of the first visible spacing region is recorded opposite to the direction of travel of the motor vehicle—and thus rearwards—by means of the first coordinated actuation. Objects are searched for by means of the first recording, wherein if an object is found, a first object spacing is estimated as a spacing between the found object and the optical sensor. Finally, a planned movement trajectory of the motor vehicle is evaluated on the basis of the first object spacing.

Objects, in particular other traffic participants, which are located behind the motor vehicle in the direction of travel, can advantageously be recognized and be measured by means of the spacing measurement. The planned movement trajectory of the motor vehicle—in particular changing lane and/or merging into a lane—can advantageously be evaluated in order to carry out the movement safely and without risk.

A method according to the laid-open German application DE 10 2020 002 994 A1 is preferably used to calculate the spacing. The first object spacing is preferably estimated by means of a method according to the laid-open German application DE 10 2020 002 994 A1. In particular, in a method according to the laid-open German application DE 10 2020 002 994 A1, a near limit and a far limit of the visible spacing region—in particular a first near limit and a first far limit of the first visible spacing region—is used to determine a spacing.

The method for generating recordings by means of an actuation of a lighting device and an actuation of an optical sensor which are chronologically coordinated with each other is in particular a method known as a gated imaging method; in particular, the optical sensor is a camera, which is only sensitively operated in a particular, limited period of time, which is referred to as "gated control". The lighting device too is correspondingly only actuated chronologically in a particular, selected period of time, in order to light up a scene on the object side, in particular the visible spacing region.

In particular, a pre-defined number of light pulses is emitted by the lighting device, preferably having a duration between 5 ns and 20 ns. The beginning and the end of the exposure of the optical sensor is coupled with the number and the duration of the emitted light pulse and a start of the lighting. As a result, a particular visible spacing region can be detected by the optical sensor by the chronological actuation of the lighting device, on the one hand, and of the optical sensor, on the other hand, with a correspondingly defined spatial position, i.e., in particular at particular spacings of the near and of the far limit of the visible spacing region from the optical sensor. A spatial position of the optical sensor and of the lighting device is known from the structure of the gated camera. Preferably, a spatial distance between the lighting device and the optical sensor is additionally known, and is small in comparison with the spacing of the lighting device or of the optical sensor from the visible spacing region. In the context of the present technical teaching, a spacing between the optical sensor and the visible spacing region is thus the same as a spacing between the gated camera and the visible spacing region.

The visible spacing region is thus the region—on the object side—in three-dimensional space which is imaged by means of the optical sensor in a two-dimensional recording on an image plane of the optical sensor due to the number and the duration of the light pulses of the lighting device and the start of the lighting in connection with the start and the end of the exposure of the optical sensor.

By contrast, the observation region is in particular the region—on the object side—in three-dimensional space which could be imaged by means of the optical sensor as a whole—in particular to a maximum—in a two-dimensional recording in the case of sufficient lighting and exposure of the optical sensor. In particular, the observation region corresponds to the entire exposable image region of the optical sensor which could theoretically be illuminated. The visible spacing region is thus a subset of the observation region in actual space. Correspondingly, only a subset of the image plane of the optical sensor is exposed in the method suggested here, wherein this subset of the image plane is in particular given between a start image line and an end image line.

When the term "on the object side" is used here and in the following, a region in actual space is meant. When the term "on the image" is used here and in the following, a region on the image plane of the optical sensor is meant. The observation region and the visible spacing region are given here on the object side. They correspond to regions on the image side on the image plane assigned by the laws of imaging and by the chronological actuation of the lighting device and of the optical sensor.

Depending on the start and the end of the exposure of the optical sensor, light pulse photons hit the optical sensor after the lighting by the lighting device begins. The further away the visible spacing region is from the lighting device and the optical sensor, the longer it takes until a photon which is reflected in this spacing region hits the optical sensor. The chronological spacing between an end of the lighting and a beginning of the exposure increases, the further the visible spacing region is from the lighting device and from the optical sensor.

According to one embodiment of the method, it is thus in particular possible to define the position and the spatial width of the visible spacing region, in particular a spacing between the near limit and the far limit of the visible spacing region, by a correspondingly suitable choice of the chronological actuation of the lighting device, on the one hand, and of the optical sensor, on the other hand.

In a preferred embodiment of the method, the visible spacing region is pre-determined, wherein the chronological coordination of the lighting device, on the one hand, and of the optical sensor, on the other hand, is correspondingly pre-determined therefrom.

In a further preferred embodiment of the method, the chronological coordination of the lighting device, on the one hand, and of the optical sensor, on the other hand, is pre-determined, wherein the visible spacing region is correspondingly pre-determined from the chronological coordination.

An image line is here in particular understood to mean the set of all pixels of a recording in the image plane of the optical sensor which lie on a common line in the image plane.

In a preferred embodiment, the lighting device has at least one surface emitter, in particular a so-called VCSE laser. As an alternative or in addition, the optical sensor is preferably a camera.

Preferably, in addition to the first object spacing, a sensor signal of an articulation angle sensor is included in the evaluation of the planned movement trajectory. In particular, by means of the articulation angle sensor, it is possible to decide whether a trailer and/or semi-trailer is blocking the view opposite to the direction of travel of the motor vehicle and therefore an evaluation of the planned movement trajectory is not possible.

Preferably, the articulation angle sensor measures an angle between the motor vehicle and a trailer which is connected to the motor vehicle.

In the context of the present technical teaching, the planned movement trajectory of the motor vehicle is implemented by means of an actuator system of the motor vehicle, in particular by means of steering movements, acceleration processes and/or braking processes.

In the method according to the laid-open German application DE 10 2020 002 994 A1, a start image line for a near limit of the visible spacing region is determined in the recording. Furthermore, an end image line for the far limit of the visible spacing region is determined in the recording. A base point image line is determined in the recording, wherein the base point image line is that image line in which, on the one hand, the object can be detected, and which on the other hand has the smallest spacing—in the image plane of the optical sensor—from the start image line. Finally, the spacing from the object is determined by evaluating the image location of the base point image line relative to the start image line and the end image line while taking into account the spatial location of the visible spacing region.

In particular, the base point image line is preferably determined as follows: In the recording, an object recognition is in particular carried out by means of pattern recognition, preferably using a classification algorithm and/or by means of deep learning. If an object is recognized, all the image lines in which the object is depicted are determined in the recording on the basis of this recognition or classification. The image line which has the smallest spacing from the start image line is thus determined as the base point image line.

Preferably, the object spacing is determined as a spacing between the object and the optical sensor, wherein a spacing region width is determined as the difference between the end of the visible spacing region and the beginning of the visible spacing region. A base point spacing is determined as an image line spacing on the optical sensor between the base point image line and the start image line. A spacing region image width between the end image line and the start image line is further determined as a spacing region image width. The object spacing is then finally determined as a sum of the beginning of the visible spacing region, i.e., in particular the spatial distance between the beginning of the visible spacing region and the optical sensor, and the product of the spacing region width with the ratio of the base point spacing to the spacing region image width. In particular, the object spacing is determined according to the following formula:

$$x = x_{near} + (x_{far} - x_{near}) \frac{v - v_{near}}{v_{far} - v_{near}} \tag{1}$$

wherein $x_{near}$ is the beginning of the visible spacing region, $x_{far}$ is the end of the visible spacing region, $(x_{far} - x_{near})$ is correspondingly the spacing region width, $v_{near}$ is the start image line, $v_{far}$ is the end image line, and $(v_{far} - v_{near})$ is correspondingly the spacing region image width, v is the base point image line, $(v - v_{near})$ is correspondingly the base point spacing, and x is the object spacing.

According to a development of the invention, it is provided that a speed of the found object is determined by means of a radar sensor. As an alternative or in addition, it is provided that the speed of the found object is determined by means of a lidar sensor. Advantageously, the planned movement trajectory can be evaluated even better and more reliably by means of the speed of the found object.

According to a development of the invention, it is provided that the found object is assigned to a lane by means of the first recording. Advantageously, it can thus be determined whether the found object is located on a lane which, on the basis of the planned movement trajectory, should be driven in by the motor vehicle. It is thus advantageously possible to differentiate between objects which are relevant and irrelevant for the planned movement trajectory.

According to a development of the invention, it is provided that, if no object is found in the first recording, a second visible spacing region is assigned to a second coordinated actuation, wherein a second recording of the second visible spacing region is recorded opposite to the direction of travel of the motor vehicle by means of the second coordinated actuation. Objects are searched for by means of the second recording, wherein if an object is found, the first object spacing is estimated as a spacing between the found object and the optical sensor. On the basis of the first object spacing, the planned movement trajectory of the motor vehicle is evaluated.

Preferably, a first width of the first visible spacing region and a second width of the second visible spacing region are identical. As an alternative or in addition, the first visible spacing region and the second visible spacing region overlap at most partially. As an alternative or in addition, a far limit of the first visible spacing region preferably corresponds to a near limit of the second visible spacing region, or preferably a near limit of the first visible spacing region corresponds to a far limit of the second visible spacing region.

In the context of the present technical teaching, a width of the visible spacing region is a spacing between the near limit and the far limit of the visible spacing region.

Preferably, the width of the visible spacing region is at least 50 m to a maximum of 300 m.

Advantageously, a region on the object side can thus be observed by means of a plurality of visible spacing regions, in particular in the manner of a scan. Preferably, the width of the visible spacing region is at least 80 m when performing the observation in the manner of a scan.

According to a development of the invention, it is provided that if an object has been found and the first object spacing has been estimated, a third coordinated actuation is determined such that the found object—in particular the first object spacing—lies within a third visible spacing region, which is assigned to the third coordinated actuation, wherein a third width of the third visible spacing region is smaller than the first width of the first visible spacing region. By means of the third coordinated actuation, a third recording of the third visible spacing region is recorded opposite to the direction of travel of the motor vehicle. Objects are searched for by means of the third recording, wherein if the object is found, a second object spacing is estimated as a spacing between the found object and the optical sensor. The planned movement trajectory of the motor vehicle is evaluated on the basis of the first object spacing, and in addition on the basis of the second object spacing.

Advantageously, a determination of the spacing between the optical sensor and the found object is more precise, the smaller the width of the visible spacing region. The estimation of the second object spacing is thus advantageously more precise than the estimation of the first object spacing.

Preferably, at least one width, selected from the first width of the first visible spacing region, the second width of the second visible spacing region and a width of a region of the plurality of visible spacing regions is at least 150 m to a maximum of 300 m. As an alternative or in addition, the third width of the third visible spacing region is 50 m to a maximum of 150 m.

The second object spacing is preferably estimated by means of a method according to the laid-opne German application DE 10 2020 002 994 A1.

Preferably, the motor vehicle's own speed is included to determine the third coordinated actuation, such that the found object is located in the third visible spacing region. As an alternative or in addition, the speed of the found object is preferably included to determine the third coordinated actuation, such that the found object is located in the third visible spacing region. As an alternative or in addition, a speed difference is preferably included in the determination of the third coordinated actuation as the difference between the motor vehicle's own speed and the speed of the found object, such that the found object is located in the third visible spacing region.

In a preferred embodiment, the region on the object side is observed in the manner of a scan by means of at least one visible spacing region, in particular the first visible spacing region, or a plurality of visible spacing regions until an object is found. The second object spacing is then determined by means of the third coordinated actuation in order to advantageously determine a more precise estimation of the distance of the found object from the optical sensor.

According to a development of the invention, it is provided that in at least one recording, selected from the first recording, preferably the second recording, preferably the third recording and an activation recording, objects are searched for by means of a headlight detection method. Preferably, the activation recording is recorded chronologically before the first recording by means of the optical sensor opposite to the direction of travel of the motor vehicle. Advantageously, it is thus possible to control whether the planned movement trajectory is evaluated. In particular, an evaluation of the planned movement trajectory is only necessary if at least one headlight is detected opposite to the direction of travel of the motor vehicle by means of the headlight detection method. In addition, the headlight detection method can find and/or detect an object, in particular at a low brightness level, in a simple and reliable manner.

Preferably, the headlight detection method is a method which is designed to find depictions of headlights in a recording (preferably of the optical sensor), whereby the presence of objects, in particular of motor vehicles and/or motorbikes, can then be determined therefrom.

In a preferred embodiment, the recordings—in particular the first recording and the second recording, the first recording and the third recording, or the plurality of recordings—are recorded at a recording rate of at least 20 Hz to a maximum of 90 Hz. At a recording rate of at least 20 Hz to a maximum of 90 Hz, it is advantageously unnecessary to consider the motor vehicle's own speed and/or the speed of the found object to determine a further coordinated actuation.

According to a development of the invention, it is provided that the movement trajectory is evaluated to ascertain whether a lane change can begin and/or it is possible to merge into a lane.

The object is also solved by providing a control device which is equipped to carry out a method according to the invention or a method according to one or more of the previously described embodiments. The control device is preferably designed as a computer device, particularly preferably as a computer, or as a control unit, in particular as a control unit of a motor vehicle. In particular, the advantages which have already been explained in connection with the method result in connection with the control device.

The control device is preferably equipped to be operatively connected to the gated camera, in particular to the lighting device and the optical sensor, and is equipped for their respective actuation.

In addition, the control device is preferably equipped to be operatively connected to the articulation angle sensor, and is additionally preferably equipped for its respective actuation. As an alternative or in addition, the control device is preferably equipped to be operatively connected to the radar sensor, and is equipped for its respective actuation. As an alternative or in addition, the control device is preferably equipped to be operatively connected to the lidar sensor, and is equipped for its respective actuation.

The object is also solved by providing an over-the-shoulder view device, which has a gated camera comprising a lighting device and an optical sensor and which has a control device according to the invention or a control device according to one or more of the previously described embodiments. In particular, the advantages which have already been explained in connection with the method and the control device result in connection with the over-the-shoulder view device.

In a preferred embodiment, the over-the-shoulder view device additionally has an articulation angle sensor, which is equipped to generate a sensor signal which enables a conclusion to be made as to whether a trailer and/or semi-trailer is blocking the view opposite to the direction of travel. As an alternative or in addition, the over-the-shoulder view device preferably has a radar sensor, which is equipped to estimate the speed of the found object. As an alternative or in addition, the over-the-shoulder view device preferably has a lidar sensor, which is equipped to estimate the speed of the found object.

The control device is preferably operatively connected to the gated camera, in particular to the lighting device and the optical sensor, and is equipped for their respective actuation.

In addition, the control device is preferably operatively connected to the articulation angle sensor, and is additionally preferably equipped for its respective actuation. As an alternative or in addition, the control device is preferably operatively connected to the radar sensor, and is equipped for its respective actuation. As an alternative or in addition, the control device is preferably operatively connected to the lidar sensor, and is equipped for its respective actuation.

The object is also solved by providing a motor vehicle having an over-the-shoulder view device according to the invention or an over-the-shoulder view device according to one or more of the previously described embodiments. In particular, the advantages which have already been explained in connection with the method, the control device and the over-the-shoulder view device result in connection with the motor vehicle.

In a preferred embodiment, the motor vehicle is an autonomous motor vehicle. As an alternative or in addition, the motor vehicle is preferably a heavy goods vehicle. It is also possible, however, that the motor vehicle is a passenger car, a commercial vehicle or another motor vehicle.

The invention is explained in more detail in the following with reference to the drawings.

DETAILED DESCRIPTION OF THE DRAWINGS

Figure 1:
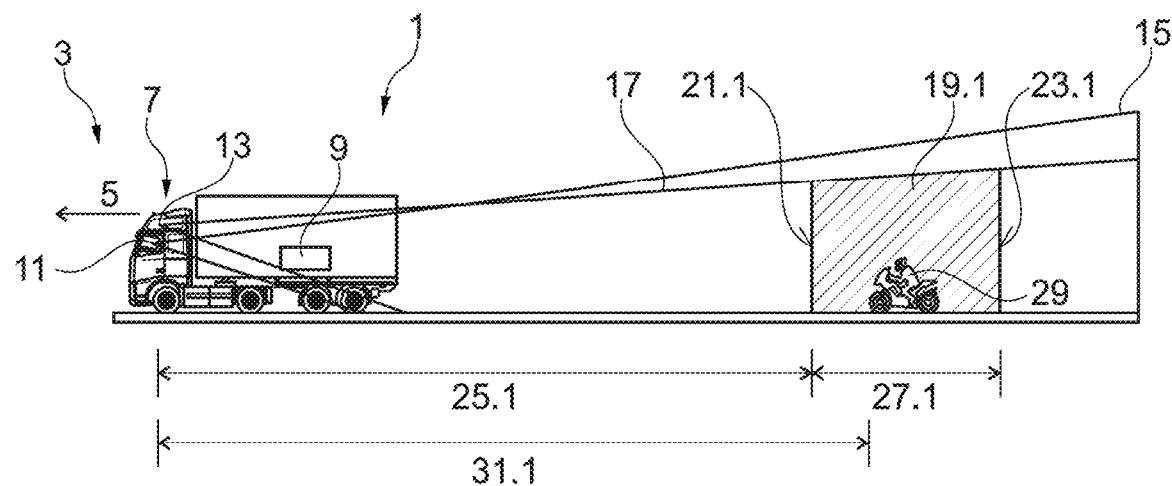
FIG. 1 shows a schematic depiction of an exemplary embodiment of a motor vehicle having a first visible spacing region.

FIG. 1 shows a schematic depiction of an exemplary embodiment of a motor vehicle 1 having an over-the-shoulder view device 3, which is equipped to take recordings 33 opposite to a direction of travel 5. The over-the-shoulder view device 3 has a gated camera 7 and a control device 9. The gated camera 7 further has a lighting device 11—preferably a laser, in particular a VSCE laser—and an optical sensor 13—preferably a camera. The control device 9 is only schematically depicted here, and is operatively connected in a manner not explicitly depicted to the gated camera 7, in particular to the lighting device 11 and to the optical sensor 13, and is equipped for their respective actuation. In FIG. 1, a lighting frustum 15 of the lighting device 11 and an observation region 17 of the optical sensor 13 are in particular depicted.

A first visible spacing region 19.1, which results as a subset of the lighting frustum 15 of the lighting device 11 and the observation region 17 of the optical sensor 13, is additionally depicted by cross-hatching. The first visible spacing region 19.1 has a first near limit 21.1 and a first far limit 23.1. The first near limit 21.1 of the first visible spacing region 19.1 has a first distance 25.1 from the optical sensor 13. In addition, the first visible spacing region 19.1 has a first width 27.1 as a spacing between the first near limit 21.1 and the first far limit 23.1.

An object 29, in particular a motorbike, is located in the first visible spacing region 19.1. A first object spacing 31.1 is estimated by means of a first recording 33.1 of the first visible spacing region 19.1. Preferably, the first object spacing 31.1 is estimated by means of the first near limit 21.1 and the first far limit 23.1 of the first visible spacing region 19.1, in particular using a method according to the laid-open German application DE 10 2020 002 994 A1.

Figure 2:
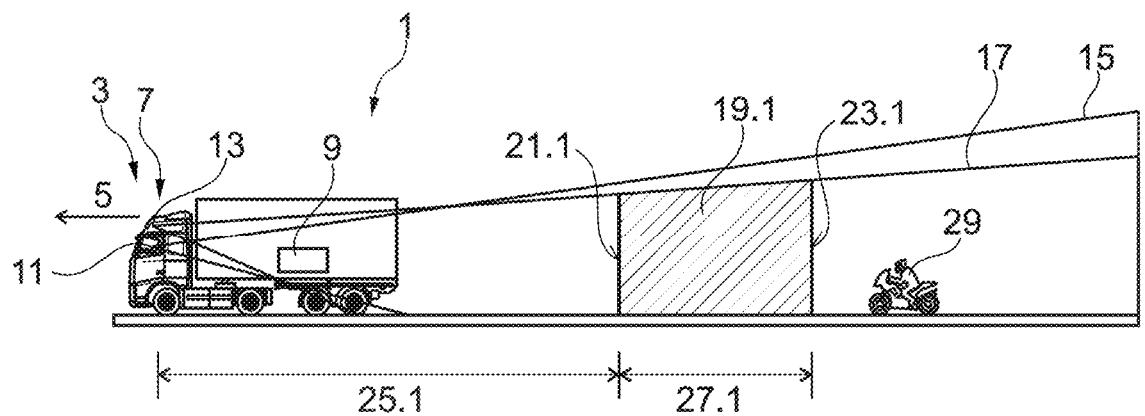
FIGS. 2 a) and 2 b) show schematic depictions of the exemplary embodiment of the motor vehicle having a first and a second visible spacing region, respectively.
Figure 2:
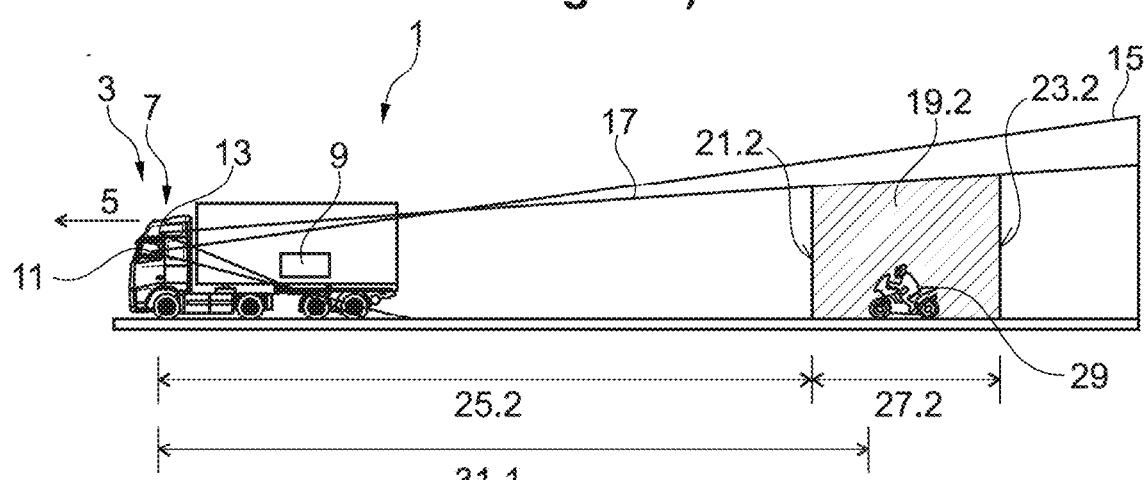

FIG. 2 shows a schematic depiction of the exemplary embodiment of the motor vehicle 1 having a first visible spacing region 19.1 and a second visible spacing region 19.2.

Identical and functionally identical elements are provided with the same reference signs in all figures, such that reference is made to the preceding description.

In FIG. 2 a), no object is located in the first visible spacing region 19.1. In particular, the object 29, in particular the motorbike, is located outside of the first visible spacing region 19.1, in particular behind the first far limit 23.1. Thus, no object can be found by means of the first recording 33.1.

A position and the first width 27.1 of the first visible spacing region 19.1 in FIG. 1 and FIG. 2 are preferably different. As an alternative, the position and the first width 27.1 of the first visible spacing region 19.1 in FIG. 1 and FIG. 2 are identical.

In FIG. 2 b), the second visible spacing region 19.2 is depicted. In particular, the far limit 23.1 of the first visible spacing region 19.1 is a second near limit 21.2 of the second visible spacing region 19.2. In particular, an intersection region of the lighting frustum 15 of the lighting device 11 and the observation region 17 of the optical sensor 13 are observed in the manner of a scan by means of the first visible spacing region 19.1 and the second visible spacing region 19.2.

Preferably, the second near limit 21.2 of the second visible spacing region 19.2 has a second distance 25.2 from the optical sensor 13. In addition, the second visible spacing region 19.2 has a second width 27.2 as a spacing between the second near limit 21.2 and the second far limit 23.2. Preferably, the first width 27.1 and the second width 27.2 are identical.

The object 29, in particular a motorbike, is located within the second visible spacing region 19.2. The first object spacing 31.1 is estimated by means of a second recording 33.2 of the second visible spacing region 19.2.

Figure 3:
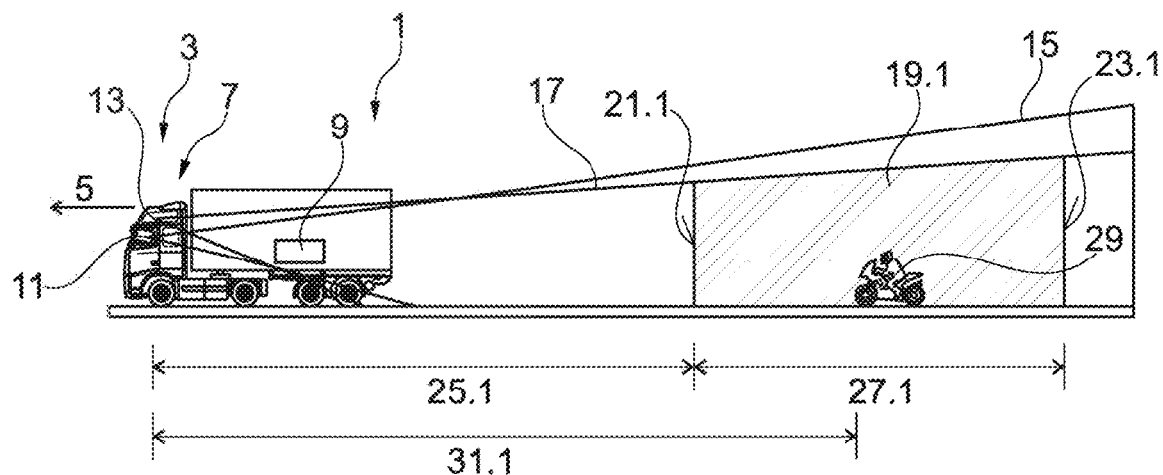
FIGS. 3 a) and 3 b) show schematic depictions of the exemplary embodiment of the motor vehicle having a first and a third visible spacing region, respectively.
Figure 3:
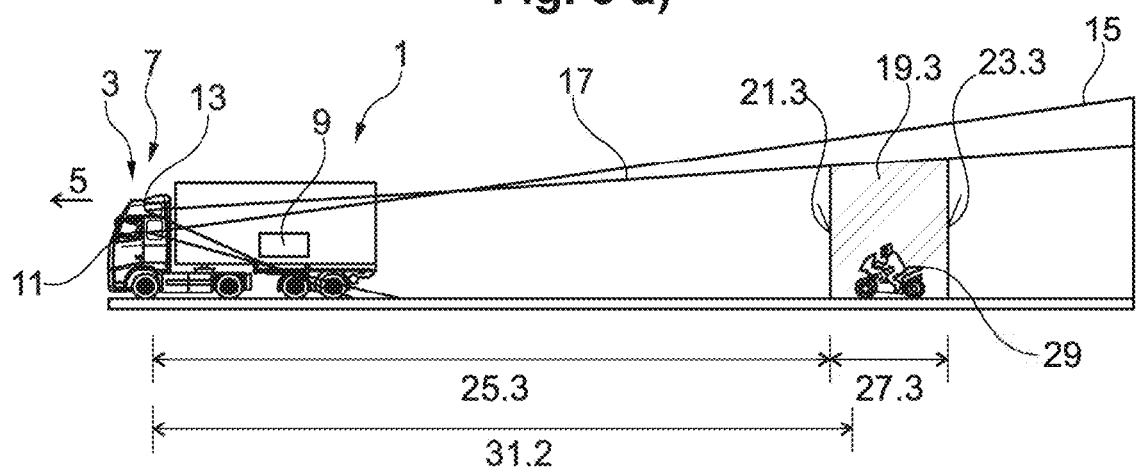

FIG. 3 shows a schematic depiction of the exemplary embodiment of the motor vehicle 1 having a first visible spacing region 19.1 and a third visible spacing region 19.3.

In FIG. 3 a), the first visible spacing region 19.1 is depicted. In particular, the object 29, in particular the motorbike, is located within the first visible spacing region 19.1. The first object spacing 31.1 is estimated by means of the first recording 33.1 of the first visible spacing region 19.1.

The position and the first width 27.1 of the first visible spacing region 19.1 in FIG. 1 and FIG. 3 are preferably different. As an alternative, the position and the first width 27.1 of the first visible spacing region 19.1 in FIG. 1 and FIG. 3 are identical. As an alternative, the position and the first width 27.1 of the first visible spacing region 19.1 in FIG. 2 and FIG. 3 are preferably different. As an alternative, the position and the first width 27.1 of the first visible spacing region 19.1 in FIG. 2 and FIG. 3 are identical.

In FIG. 3 b), the third visible spacing region 19.3 is depicted. Preferably, a third near limit 21.3 of the third visible spacing region 19.3 has a third distance 25.3 from the optical sensor 13. In addition, the third visible spacing region 19.3 has a third width 27.3 as a spacing between the third near limit 21.3 and a third far limit 23.3. In addition, the third width 27.3 is preferably smaller than the first width 27.1. In particular, the third visible spacing region 19.3 is selected such that the found object 29 lies within the third visible spacing region 19.3.

A second object spacing 31.2 is estimated by means of a third recording 33.3 of the third visible spacing region 19.3.

In FIGS. 1, 2 and 3, the control device 7 is in particular equipped to carry out a method for operating the gated camera 7 and a planned movement trajectory of the motor vehicle 1.

Figure 4:
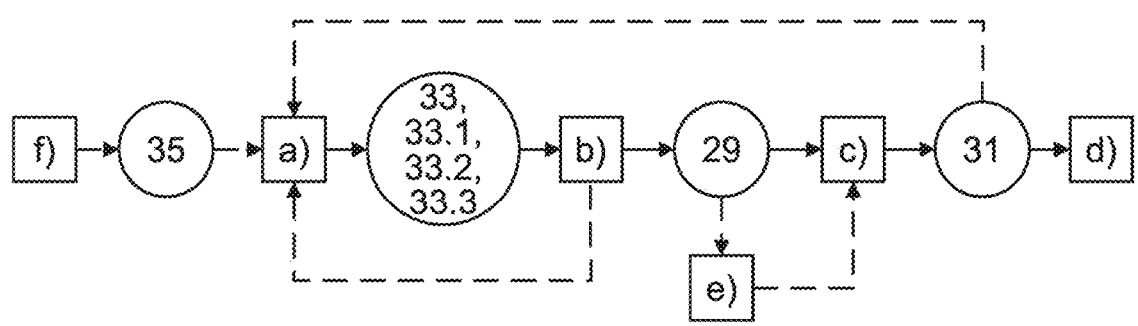
FIG. 4 shows a schematic depiction of a flow diagram of an exemplary embodiment of a method for operating a gated camera.

FIG. 4 shows a schematic depiction of a flow diagram of an exemplary embodiment of the method for operating the gated camera 7.

In a first step a), a visible spacing region 19 is assigned to a coordinated actuation—in particular, the first visible spacing region 19.1 is assigned to a first coordinated actuation. Furthermore, a recording 33 of the visible spacing region 19 is recorded opposite to the direction of travel 5 of the motor vehicle 1 by means of a coordinated actuation—in particular, the first recording 33.1 of the first visible spacing region 19.1 is recorded by means of the first coordinated actuation.

In a second step b), objects 29 are searched for by means of the recording 33—in particular by means of the first recording 33.1.

If the object 29 is found, in a third step c), an object spacing 31—in particular the first object spacing 31.1—is estimated as a spacing between the found object 29 and the optical sensor 13.

In a fourth step d), a planned movement trajectory of the motor vehicle 1 is evaluated on the basis of the object spacing 31—in particular the first object spacing 31.1 Preferably, the movement trajectory is evaluated to determine whether a lane change can begin. As an alternative or in addition, the movement trajectory is preferably evaluated to determine whether it is possible to merge into a lane.

If no object 29 is found in the second step b), in a preferred embodiment of the method, the method is begun again with the first step a). Preferably, when the first step a) is carried out again, the second visible spacing region 19.2 is assigned to a first coordinated actuation. In addition, by means of the second coordinated actuation, a second recording 33.2 of the second visible spacing region 19.2 is preferably recorded opposite to the direction of travel 5 of the motor vehicle 1. When the second step b) is carried out again, objects 29 are then preferably searched for by means of the second recording 33.2. If, when the second step b) is carried out for the second time, the object 29 is found, the object spacing 31—in particular the first object spacing 31.1—is preferably estimated using the second recording 33.2. If, when the second step b) is carried out again, no object 29 is found again, the method can preferably be started again with the first step a).

In a further preferred embodiment, after the third step c), the first step a) is carried out again. Preferably, when the first step a) is carried out again, a third coordinated actuation is determined such that the first object spacing 31.1 lies within the third visible spacing region 19.3, which is assigned to the third coordinated actuation. Preferably, the third width 27.3 of the third visible spacing region 19.3 is smaller than a first width 27.1 of the first visible spacing region 19.1. In addition, by means of the third coordinated actuation, the third recording 33.3 of the third visible spacing region 19.3 is preferably recorded opposite to the direction of travel 5 of the motor vehicle 1. When the second step b) is carried out again, objects 29—in particular the object 29, in particular the motorbike—are then preferably searched for by means of the third recording 33.3. If the object 29 is found, when the third step c) is carried out again, the second object spacing 31.2 is estimated as a spacing between the found object 29, in particular the motorbike, and the optical sensor 13. In the fourth step d), the planned movement trajectory of the motor vehicle 1 is then evaluated on the basis of the first object spacing 31.1, and in addition on the basis of the second object spacing 31.2.

In an optional fifth step e), a speed of the found object 29 is preferably determined before the third step c) by means of a radar sensor and/or a lidar sensor.

Preferably, in the second step b), the found object 29 is assigned to a lane by means of a recording 33, in particular selected from the first recording 33.1, preferably the second recording 33.2, and preferably the third recording 33.3. As an alternative, in the third step c), the found object 29 is preferably assigned to a lane by means of a recording 33, in particular selected from the first recording 33.1, preferably the second recording 33.2, and preferably the third recording 33.3.

In an optional sixth step f), an activation recording 35 is preferably recorded opposite to the direction of travel 5 of the motor vehicle 1 by means of the optical sensor 13, in particular without lighting by means of the lighting device 11, preferably before the first recording 33.1. In addition, objects 29 are preferably searched for in the activation recording 35 by means of a headlight detection method.

In the second step b), objects 29 are preferably searched for in the first recording 33.1 by means of the headlight detection method. As an alternative or in addition, in the second step b), objects 29 are preferably searched for in the second recording 33.2 by means of the headlight detection method. As an alternative or in addition, in the second step b), objects 29 are preferably searched for in the third recording 33.3 by means of the headlight detection method.

The invention claimed is:

1. A method for operating a gated camera (7) which has a lighting device (11) and an optical sensor (13) in a motor vehicle (1) opposite to a direction of travel (5) of the motor vehicle (1), comprising the steps of:
    an actuation of the lighting device (11) and of the optical sensor (13) are chronologically coordinated with each other in a gated imaging method, wherein in the gated imaging method a pre-defined number of light pulses is emitted by the lighting device (11) and a beginning and an end of an exposure of the optical sensor (13) is coupled with the pre-defined number and a duration of the emitted light pulses and a start of the light pulses such that a first visible spacing region (19.1) is detected by the optical sensor (13) by the chronological coordination of the lighting device (11) and of the optical sensor (13) with a correspondingly defined spatial position;
    assigning the first visible spacing region (19.1) to a first coordinated actuation;

via the first coordinated actuation, a first recording (33.1) of the first visible spacing region (19.1) is recorded opposite to the direction of travel (5) of the motor vehicle (1);

searching for objects (29) via the first recording (33.1);

when an object (29) is found, a first object spacing (31.1) is estimated as a spacing between the found object (29) and the optical sensor (13); and a planned movement trajectory of the motor vehicle (1) is evaluated on a basis of the first object spacing (31.1).

2. The method according to claim 1, wherein a speed of the found object (29) is determined by a radar sensor and/or a lidar sensor.

3. The method according to claim 1, wherein the found object (29) is assigned to a lane via the first recording (33.1).

4. The method according to claim 1, wherein:

when no object (29) is found in the first recording (33.1), a second visible spacing region (19.2) is assigned to a second coordinated actuation;

via the second coordinated actuation, a second recording (33.2) of the second visible spacing region (19.2) is recorded opposite to the direction of travel (5) of the motor vehicle (1);

searching for objects (29) via the second recording (33.2);

when an object (29) is found, the first object spacing (31.1) is estimated as a spacing between the found object (29) and the optical sensor (13); and the planned movement trajectory of the motor vehicle (1) is evaluated on the basis of the first object spacing (31.1).

5. The method according to claim 4, wherein:

when an object (29) is found, and the first object spacing (31.1) has been estimated, a third coordinated actuation is determined such that the found object (29) lies within a third visible spacing region (19.3) which is assigned to the third coordinated actuation;

wherein a third width (27.3) of the third visible spacing region (19.3) is smaller than a first width (27.1) of the first visible spacing region (19.1);

via the third coordinated actuation, a third recording (33.3) of the third visible spacing region (19.3) is recorded opposite to the direction of travel (5) of the motor vehicle (1);

searching for an object (29) via the third recording (33.3);

when an object (29) is found, a second object spacing (31.2) is estimated as a spacing between the found object (29) and the optical sensor (13); and the planned movement trajectory of the motor vehicle (1) is additionally evaluated on a basis of the second object spacing (31.2).

6. The method according to claim 5, wherein in at least one recording (33, 35) selected from the first recording (33.1), the second recording (33.2), the third recording (33.3), and an activation recording (35), objects (29) are searched for via a headlight detection method, wherein the activation recording (35) is recorded by the optical sensor (13) opposite to the direction of travel (5) of the motor vehicle (1) chronologically before the first recording (33.1).

7. The method according to claim 1, wherein the planned movement trajectory is evaluated to ascertain whether a lane change can begin and/or whether it is possible to merge into a lane.

8. A control device (9) configured to perform the method according to claim 1.

9. An over-the-shoulder view device (3), comprising:

a gated camera (7) which has a lighting device (11) and an optical sensor (13); and a control device (9) configured to perform the method according to claim 1.

* * * * *